A. J. STOESER.
MACHINE FOR MOLDING CONCRETE WALLS AND THE LIKE.
APPLICATION FILED DEC. 12, 1907.
953,720.
Patented Apr. 5, 1910.
4 SHEETS—SHEET 1.
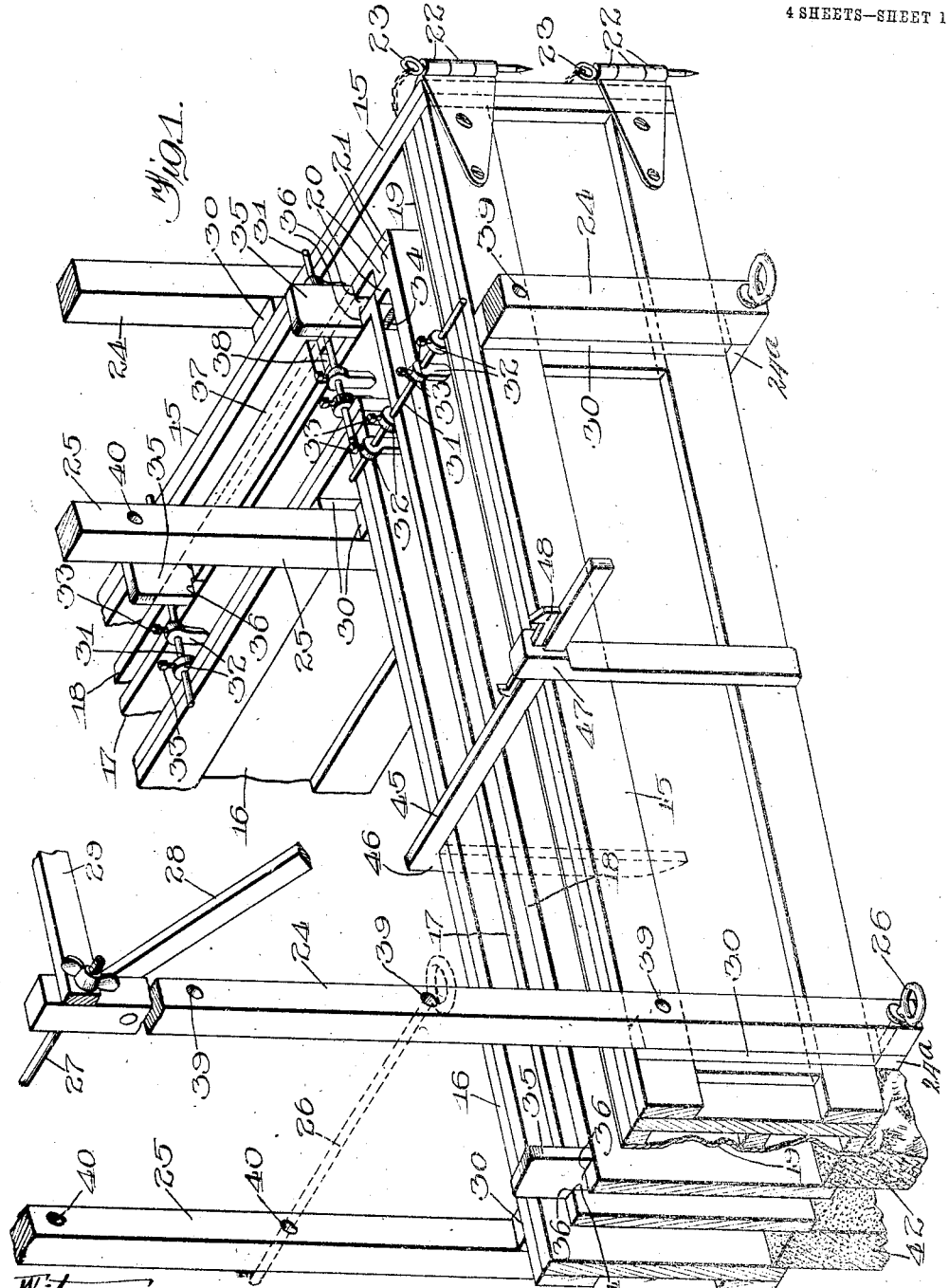

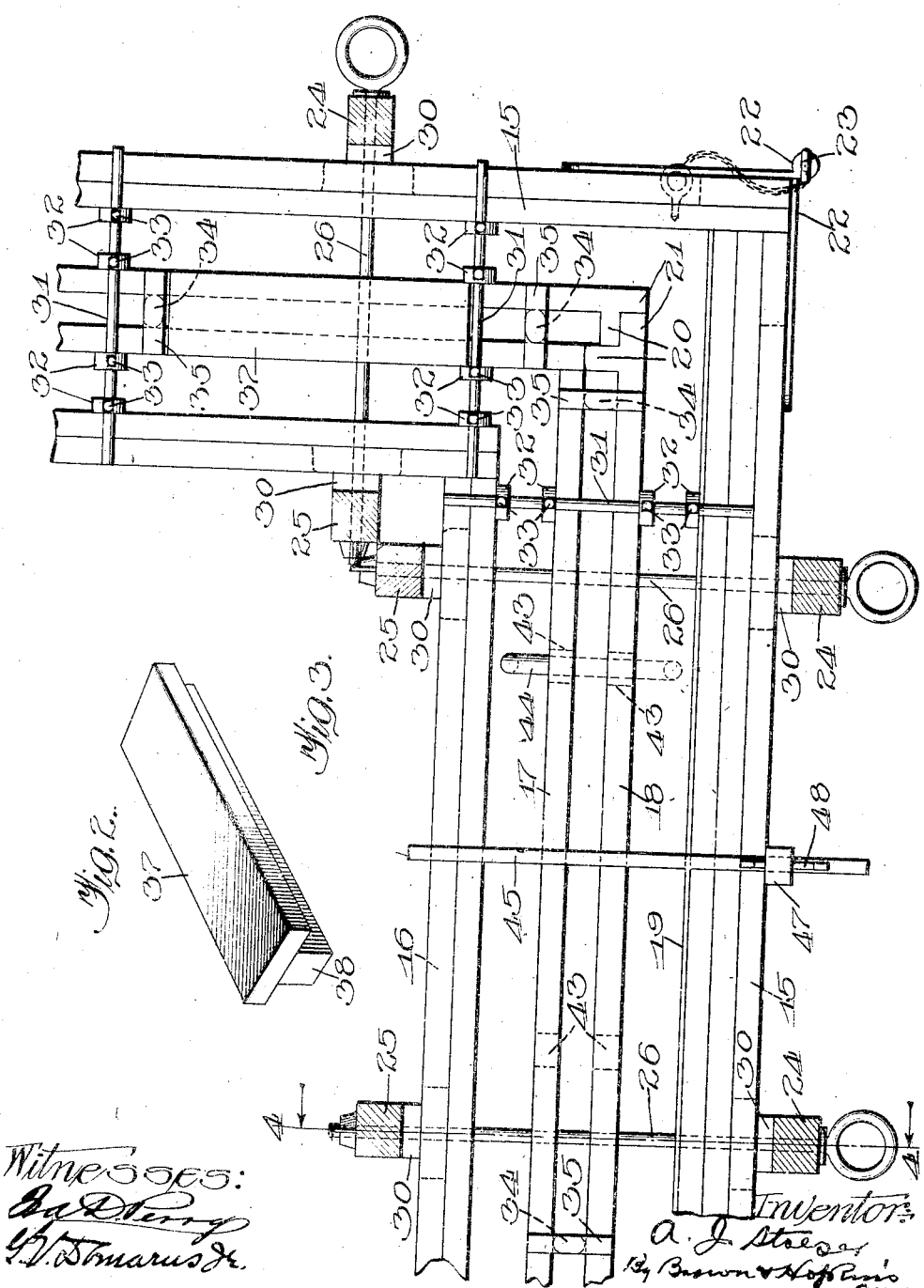

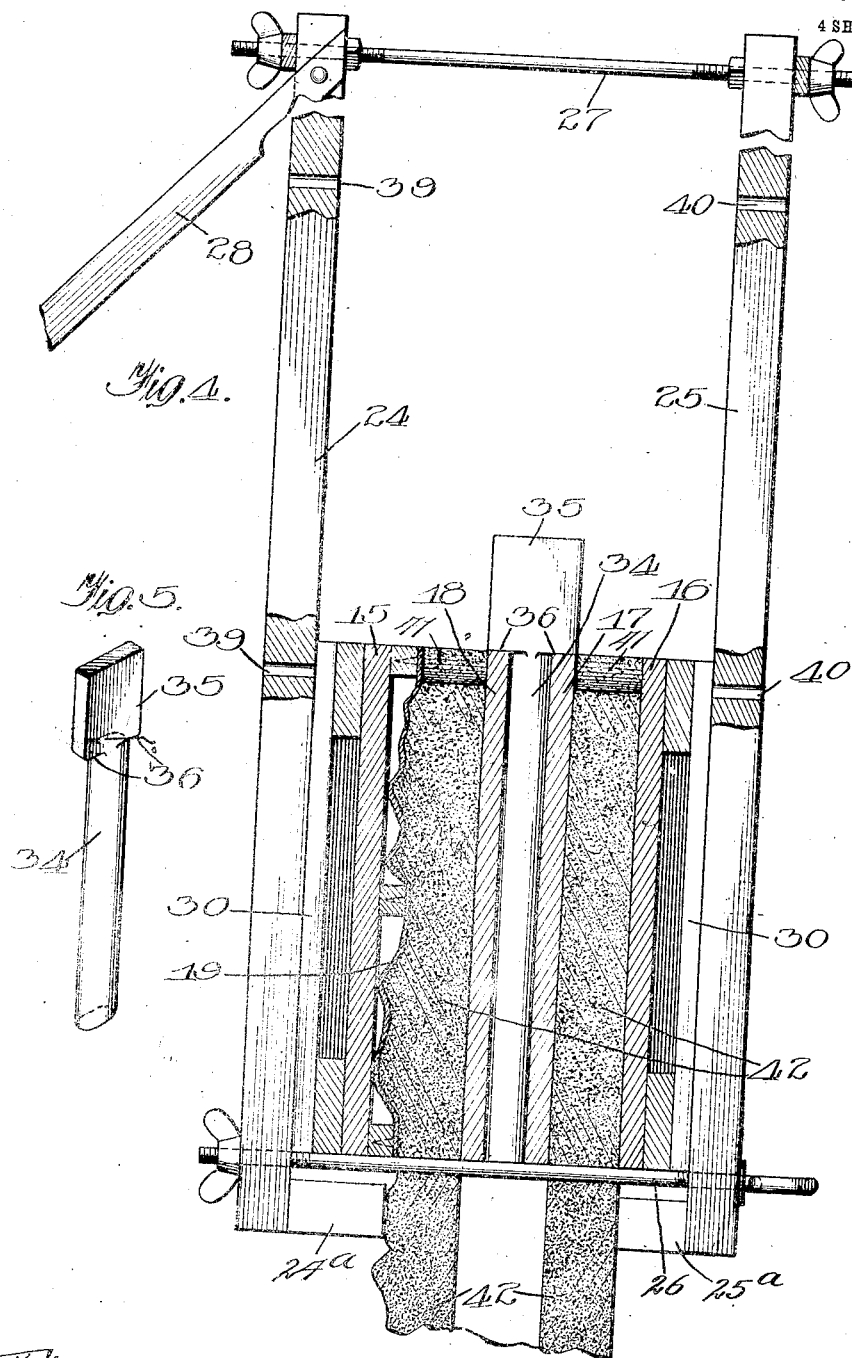

A. J. STOESER.
MACHINE FOR MOLDING CONCRETE WALLS AND THE LIKE.
APPLICATION FILED DEC. 12, 1907.
953,720.
Patented Apr. 5, 1910.
4 SHEETS—SHEET 4.
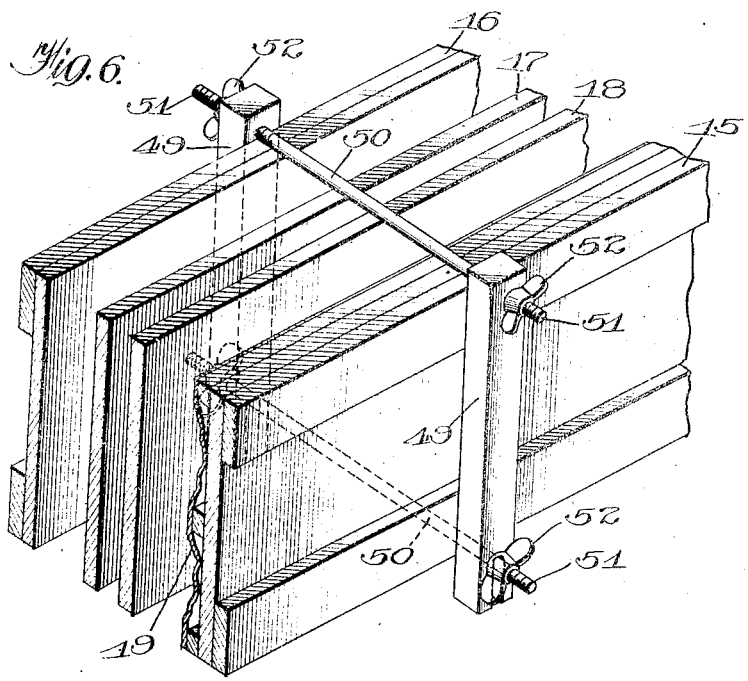
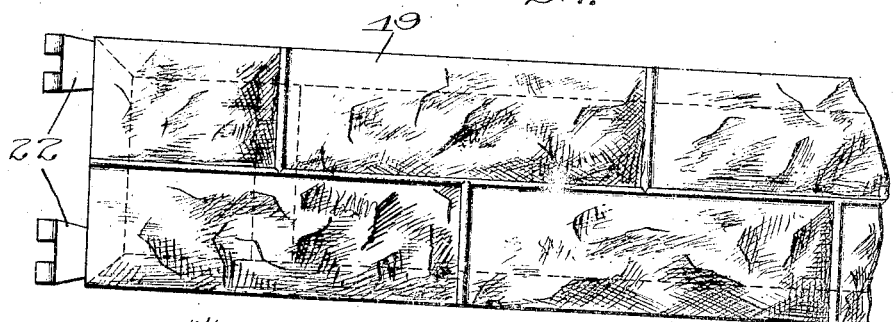
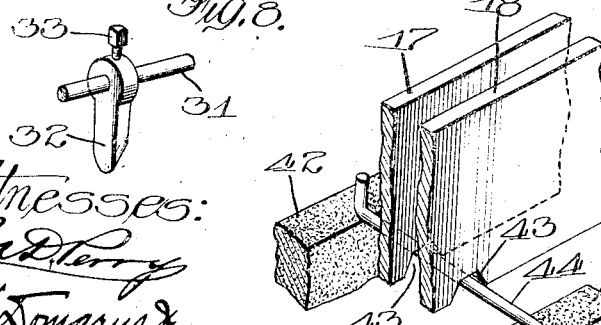
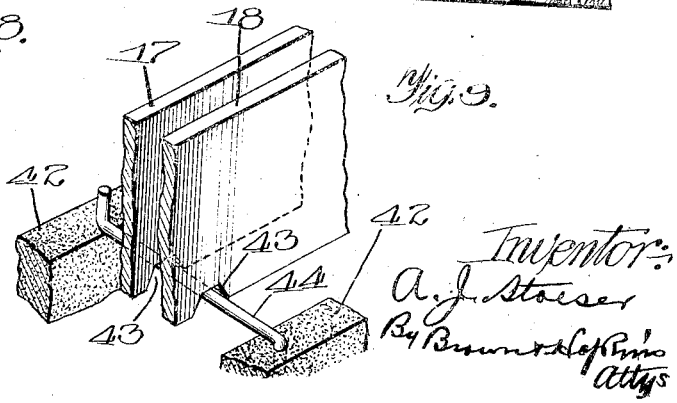
Witnesses:
Inventor:
A. J. Stoeser
By Brown & Hopkins
Attys

UNITED STATES PATENT OFFICE.

ALEXANDER J. STOESER, OF CHICAGO, ILLINOIS.

MACHINE FOR MOLDING CONCRETE WALLS AND THE LIKE.

953,720.  Specification of Letters Patent.  Patented Apr. 5, 1910.

Application filed December 12, 1907. Serial No. 406,210.

*To all whom it may concern:*

Be it known that I, ALEXANDER J. STOESER, a citizen of the United States, residing at Chicago, in the county of Cook and State of Illinois, have invented certain new and useful Improvements in Machines for Molding Concrete Walls and the Like, of which the following is a specification.

This invention relates to improvements in machines for molding walls of plastic material, commonly known as concrete, and the primary object of the invention is to provide an improved machine of this character for forming a continuous wall by molding one section at a time directly upon the wall.

A further object is to provide an improved machine of this character in which a plurality of mold members are employed and so arranged as to provide separate mold cavities for respectively forming the inner and outer faces of a hollow wall, and improved means for locking the mold members in position.

A further object is to provide an improved machine of this character in which a supporting frame is employed for the mold members, and improved means whereby the mold members may be adjusted with relation to the frame and the frame adjusted with respect to the wall to mold the sections directly upon the wall to form a continuous hollow wall.

A further object is to provide an improved matrix for molding the rough faces of the sections.

A further object is to provide an improved machine of this character which will be simple, durable and cheap in construction and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings, illustrating an embodiment of the invention, and in which—

Figure 1 is a detail perspective view of an improved machine of this character for molding the corner of a wall, and constructed in accordance with the principles of this invention. Fig. 2 is a detail perspective view of the cover or closure for closing the space between the inner mold sections which form the air space. Fig. 3 is a top plan view, partly in section, of Fig. 1. Fig. 4 is a detail sectional view on line 4—4 of Fig. 3. Fig. 5 is a detail perspective view of one of the keys for locking the inner mold sections against displacement. Fig. 6 is a detail perspective view of the mold sections showing a modified form of clamp. Fig. 7 is an elevation showing the face of the matrix for forming the rough face of the sections. Fig. 8 is a detail perspective view of one of the clamping members. Fig. 9 is a detail perspective view of the inner mold sections and one of the tie rods.

Referring more particularly to the drawings and in the present exemplification of the invention, the numerals 15, 16, designate the outside mold members, and 17, 18 the inside mold members, which latter are adapted to coöperate with the outside mold members to form separate mold cavities into which the plastic material is placed to form the wall section, the inside mold members 17, 18, serving to form the air space in the wall. One of the outside mold members, preferably the member 15, is provided with a matrix 19 on its inner face, which extends into one of the mold cavities, and this matrix is shaped to form a plurality of sections in the form of blocks which are arranged to break joint with each other, as shown more clearly in Fig. 7, so that when the mold sections are detached after forming a section of wall, the matrix may be adjusted vertically to form the next section, so that the blocks formed thereby will break joint with the upper row of block sections formed in the lower section of the wall, without the necessity of longitudinally adjusting the mold section 15.

One of the inner mold sections, preferably the section 18, is provided with a laterally projecting rib 20, which is adapted to rest against the face of the other inner mold section 17 adjacent one extremity thereof to hold these sections spaced, and the extremity of the section 18 is adapted to project beyond the lateral extension 20 so as to space the corresponding member of another mold section from its coöperating member, when the molds are assembled to form a corner, as shown in Fig. 1. In this exemplification of the invention, one extremity of one of the outer mold sections 15 is adapted to rest against the face of another one of the sections 15 and are secured together by separable coupling members 22, which are provided with registering eyes into which a suitable fastening pin or key is adapted to be inserted.

A suitable frame work comprising spaced uprights or standards 24, 25, are provided for holding the mold sections in position. These uprights may be of any desired or suitable height and are connected together by means of tie rods 26, 27, one of which passes through the lower extremity of the uprights and is adapted to rest upon the supporting surface when the first section of the wall is to be formed, and the other tie rod is adapted to connect the free extremities of the uprights. Suitable brace rods 28 may be provided for holding the uprights against displacement and connecting members 29 may be provided for holding the uprights against pivotal movement.

The uprights 24, 25, are connected by the tie rods 26, 27, and placed in proper position upon the supporting surface and are secured against displacement by means of the braces 28, one extremity of which engages one of the uprights and the free extremity thereof may be secured to any suitable support, preferably the floor timbers of the building. The sections or members 15, 16, of the mold are then placed in position within the frame work so that the lower edges thereof will rest upon the tie rods 26, and when the outer sections 15 are secured together by the fastening pins 23, if the mold is arranged to form a corner, the inner mold sections 17 and 18 are then placed in position. Suitable spacing members 30, which are preferably of a height equal to the height of the outer mold section, may be placed between the uprights or standards and the outer face of the respective mold sections 15, 16.

Suitable clamps may be provided for holding the mold sections against displacement. A suitable and efficient form of clamp comprises a bar or rod 31 which is adapted to rest upon the upper edge of the mold sections and extend entirely across the sections, and supported by the bar or rod are clamping members 32, which extend into the respective mold cavities and are adapted to engage the inner faces of the mold sections. These clamping members may be adjusted longitudinally on the bar or rod 31 so as to engage the faces of the mold sections for separating the same and may be held in their adjusted position by means of suitable clamping bolts or screws 33 passing therethrough and engaging the bar or rod 31. Any number of these clamps may be provided according to the length of the mold sections. Suitable keys 34, provided with continuous bearing faces substantially throughout their length and a head 35 to form shoulders 36, are adapted to be inserted in the space between the inner mold sections 17 and 18, so that the shoulders 36 will rest upon the top edges of the mold section and the body portion 34 thereof will extend into the space, this portion being of a length substantially equal to the height of the inner mold sections and the length of this portion 34 in cross section is greater than the width thereof so that when the mold sections are placed in position and the clamping members 32 are adjusted, the keys may be axially rotated so that the greatest diameter in cross section of the body portion thereof will extend transversely across the space between the mold sections 17 and 18, which tends to separate the inside mold sections to force them against the adjacent members 32, while the outer mold sections 15 and 16 will be held against the spacing members 30 through the medium of the clamping bar 31 and the respective members 32, thereby locking all of the parts against displacement. When the keys are placed in position and thus axially adjusted the keys will have continuous bearings against the mold members substantially throughout the entire length of the keys, thereby rendering it possible to use mold members of thin construction and at the same time uniformly adjust the mold members to prevent them from bulging.

A suitable cap or closure 37 is provided with a reduced depending rib 38 of a width slightly less than the width of the space between the sections 17 and 18 when said sections are adjusted by the key 34. This cap 37 is adapted to be placed upon the upper edges of these mold sections so that the rib 38 will extend into the space therebetween to form a closure for the space to prevent the plastic material from entering therein when the mold cavities are being filled to form one of the wall sections. After the wall section has been formed and the material allowed to "set," the caps 37 may be first removed and the keys 34 rotated axially to permit the shortest cross-sectional diameter thereof to extend transversely of the space between the mold sections, which will loosen the inner mold sections and permit them to be removed; the spacing members 30 being removed to loosen the outer mold sections so as to form the next wall section.

The uprights or standards 24, 25, are provided with a plurality of transverse apertures 39, 40, which are arranged to register with each other and these apertures are spaced from each other a distance slightly less than the height of the mold sections. After one section of wall has been formed in the manner already specified, the mold sections may be removed in the manner set forth and the lower tie bolt or rod 26 is removed from the lower extremity of the standards, and a transverse notch or groove 41 is made in the upper edge of the finished wall section 42. The tie rod or bolt 26 is then inserted into the registering apertures 39, 40, adjacent the upper edge of the wall section and the mold sections or members may be replaced between the uprights or standards 25 so that they will rest upon the tie rod or bolt 26 and after being locked in position in the manner already set forth another section of wall may be formed upon the completed section.

After the wall has been completed to substantially the height of the standards 24, 25, the tie rods or bolts which extend through the wall section may be removed and the uprights or standards adjusted bodily so as to bring the apertures in the lower extremities thereof adjacent the notch 41 in the upper edge of the top wall section, the supporting brace 28 being detached or adjusted to permit such adjustment of the supporting frame. After the uprights or standards have been thus adjusted, the tie rod or bolt 26 may be inserted through the lower apertures in the standards so that the framework will be supported by the top of the wall and the various sections of the wall may be formed in a similar manner until the wall has been built to the desired height. It will thus be seen that the mold sections are not only adjustable with relation to the supporting standards but the standards themselves are also adjustable with relation to the wall so that a continuous wall may be formed by adjusting the supporting standards and the mold sections when required.

The apertures 39 and 40 in the uprights or standards being spaced from each other a distance slightly less than the height of the mold sections, permits the mold sections to be supported in such a position when adjusted that the lower edges will slightly overlap the section of the wall which has already been formed, thereby insuring a perfect joint for the various sections of the wall.

The inner mold sections 17 and 18 may be provided with suitable notches 43 in the lower edges thereof into which the tie rods 44 may enter when the latter are placed upon the upper edge of the wall section, as shown more clearly in Fig. 9 of the drawings. If desired, a clamp comprising a body portion 45 having a laterally projecting extremity 46 may be provided for clamping the outside mold sections, as shown in Fig. 1. The clamp 45 is adapted to rest upon the upper edge of the sections with the laterally projecting extremity 46 engaging the outer face of one of the members and an adjustable member 47 is slidingly mounted on the clamp 45 and coöperates with the portion 46 and is adapted to engage the outer face of the other mold sections, so that when the member 47 is adjusted toward the laterally projecting portions 46, the outer mold sections will be drawn together, and a suitable key 48 may be provided for locking the member 47 in its adjusted position. This clamp may be dispensed with, if desired, and if used may be located at any desired point, preferably between the clamps formed by the bar 31 and the members 32, and tends to force the members in a direction opposed to the direction in which the members 32 are adapted to force the members.

In Fig. 6 is shown a modified form of clamp which may be used instead of the clamp 45 and comprises spaced members 49 which are adapted to rest against the outer face of the outer mold sections 15 and 16, and are of a length greater than the height of the mold sections. Suitable tie rods or bolts 50 are adapted to pass through the extremities of these members 49 above and below the mold sections and are provided with threaded extremities 51, which support suitable thumb nuts 52, the latter being adapted to be adjusted on the tie rods to force the members 49 against the outer face of the mold sections.

Obviously the uprights or standards 24, 25 may be of any desired length and may be provided with any suitable number of apertures 39, 40, according to the number of wall sections it is desired to form before adjusting the uprights or standards with respect to the wall.

The apertures which are formed in the wall by the tie rods or bolts 26 may be closed in any desired manner, such as by forcing some of the plastic material into the apertures after the tie rods or bolts have been removed, and the notches 41 formed in the top edge of the wall section for the accommodation of the tie rods will be filled by the plastic material as the next wall section is formed.

By providing the spacing members 30 between the uprights or standards 24, 25 and the outer faces of the mold members 15, 16, the mold members may be adjusted laterally with respect to the wall section so as to permit the matrix 19 to be moved out of engagement with the roughened faces of the sections. Blocks 24ª and 25ª may be secured respectively to the inner face of the lower extremity of the standards 24, 25, which are adapted to rest against the outer faces of the wall section to hold the standards in a proper position with relation to the wall.

In order that the invention might be fully understood by those skilled in the art, the details of the foregoing embodiment thereof have been thus specifically described, but

What I claim as new and desire to secure by Letters Patent is—

1. In a machine for forming a continuous hollow wall, the combination of an inside and an outside collapsible mold, a frame for supporting the mold to form a wall section and with relation to which the molds are adjustable to form another wall section, spacing members disposed between the outer mold and the frame, a matrix supported by one of the mold members, means for holding the outer mold and the spacing members in position, means adapted to engage the adjacent faces of the inner mold members throughout their entire length for expanding the inner mold, and means coöperating with the said expanding means to prevent displacement of the inner mold, said spacing members being adapted to be removed to permit the outer mold to be collapsed, said expanding means being adapted to be adjusted to permit the inner mold to be collapsed and said molds being both adapted to be laterally adjusted to move the matrix out of engagement with the wall section.

2. In a machine for forming a continuous hollow wall, the combination of an inner and an outer collapsible mold, a frame for supporting the molds to form a wall section and with relation to which the molds are adjustable to form another wall section, spacing members disposed between the outer mold and the frame, a detached key adapted to be inserted between the members of the inner mold, said key having a length of greater diameter in cross section than the diameter of its width and adapted to be axially rotated to extend its greatest cross section diameter transversely of the space between the inner mold members to separate the same, said key also having continuous edges substantially throughout its entire length longitudinally and adapted to have continuous bearings against the faces of the inner mold members and means operatively related to the members of both molds and adapted to hold the outer mold members and also the said spacing members in position.

3. In a machine for forming a continuous hollow wall, the combination of an inner and outer collapsible mold, a frame for supporting the molds to form a wall section and with relation to which the molds are adjustable to form another wall section, clamping members engaging the coöperating adjacent faces of each of the molds, a detached key adapted to be inserted between the members of the inner mold, said key having a width of a greater diameter in one direction than in the other and adapted to be axially rotated to cause the greatest diameter thereof to extend transversely with relation to the inner mold members to separate the same, said key also having continuous edges adapted to engage the inner members for their entire length and means for holding the outer mold members in position, and said inner mold members being adapted to be laterally adjusted when the key is adjusted to cause its greatest diameter to extend longitudinally with relation to the mold members.

4. In a machine for forming a continuous wall of plastic material, the combination of a collapsible mold, means for holding the mold in position to form one wall section, a matrix supported by one of the mold members, and means whereby the mold may be adjusted and held in position to form another wall section upon the previously formed section, said matrix being shaped to form a group of superposed section faces breaking joint with each other and so arranged that when the mold section supporting the matrix is adjusted to form another wall section upon the previously formed section and in the same plane thereof the adjacent section faces of the wall sections will break joint with each other.

5. In a machine for the purpose described, the combination of a frame including spaced uprights, a mold movable between the uprights, means for securing the mold against movement with respect to the uprights to form one wall section, said uprights being provided of a length greater than the height of the mold and throughout their length with alined apertures, said mold being adapted to be adjusted with respect to the uprights to form another wall section upon the previously formed wall section, and a member adapted to be adjusted with respect to the uprights and also adapted to pass through the alined apertures and engaging the wall below the mold and upon which the mold is adapted to be supported in position.

6. In a machine for the purpose described, the combination of a frame including spaced uprights, provided throughout their lengths with alined apertures, a member passing through the alined apertures adjacent the base of the uprights for supporting the uprights, a mold movable between the uprights and supported by the said member, means for securing the mold against displacement to form one wall section, said mold being adapted to be adjusted with relation to the uprights to form another wall section upon the first said section, and a member passing through the alined apertures adjacent the top of the previously formed wall section and below the mold to support the latter in its adjusted position, said members being adapted to be removed and forming apertures through the wall whereby the uprights may be adjusted with respect to the wall and one of the members inserted through predetermined alined apertures in the uprights and an aperture in the wall to support the uprights in their adjusted position.

7. In a machine for the purpose described, the combination of a frame including spaced uprights, provided throughout their lengths with alined apertures, a member passing through the alined apertures adjacent the base of the uprights for supporting the uprights, a mold movable between the uprights and supported by the said member, means for securing the mold against displacement to form one wall section, said mold being adapted to be adjusted with relation to the uprights to form another wall section upon the first said section, a member passing through the alined apertures adjacent the top of the previously formed wall section and below the mold to support the latter in its adjusted position, said members being adapted to be removed and forming apertures through the wall whereby the uprights may be adjusted with respect to the wall and one of the members inserted through predetermined alined apertures in the uprights and an aperture in the wall to support the uprights in their adjusted positions, and means for spacing the uprights from the faces of the first said wall section.

8. In a machine for the purpose described, the combination of a frame including spaced uprights, provided throughout their lengths with alined apertures, a member passing through the alined apertures adjacent the base of the uprights for supporting the uprights, adjustable means for connecting the upper ends of the uprights, a mold movable between the uprights and supported by the said member, means for securing the mold against displacement to form one wall section, said mold being adapted to be adjusted with relation to the upright to form another wall section upon the first said section, and a member passing through the alined apertures adjacent the top of the previously formed wall section and below the mold to support the latter in its adjusted position, said members being adapted to be removed and forming apertures through the wall whereby the uprights may be adjusted with respect to the wall and one of the members inserted through predetermined alined apertures in the uprights and an aperture in the wall to support the uprights in their adjusted position.

9. A mold for molding hollow articles of plastic materials consisting of separable opposing mold members or plates and an elongated expanding member or key disposed between said mold members, said expanding member or key having a length of greater diameter in cross-section than the diameter of its width and being provided with continuous bearing faces, said key or member being adapted to be axially rotated to separate the mold members and to have a continuous bearing against each of the mold members throughout their entire length.

In testimony whereof I have signed my name to this specification, in the presence of two subscribing witnesses, on this 7th day of December A. D. 1907.

ALEXANDER J. STOESER.

Witnesses:
J. H. JOCHUM, Jr.,
M. W. CANTWELL.